Figure 1:
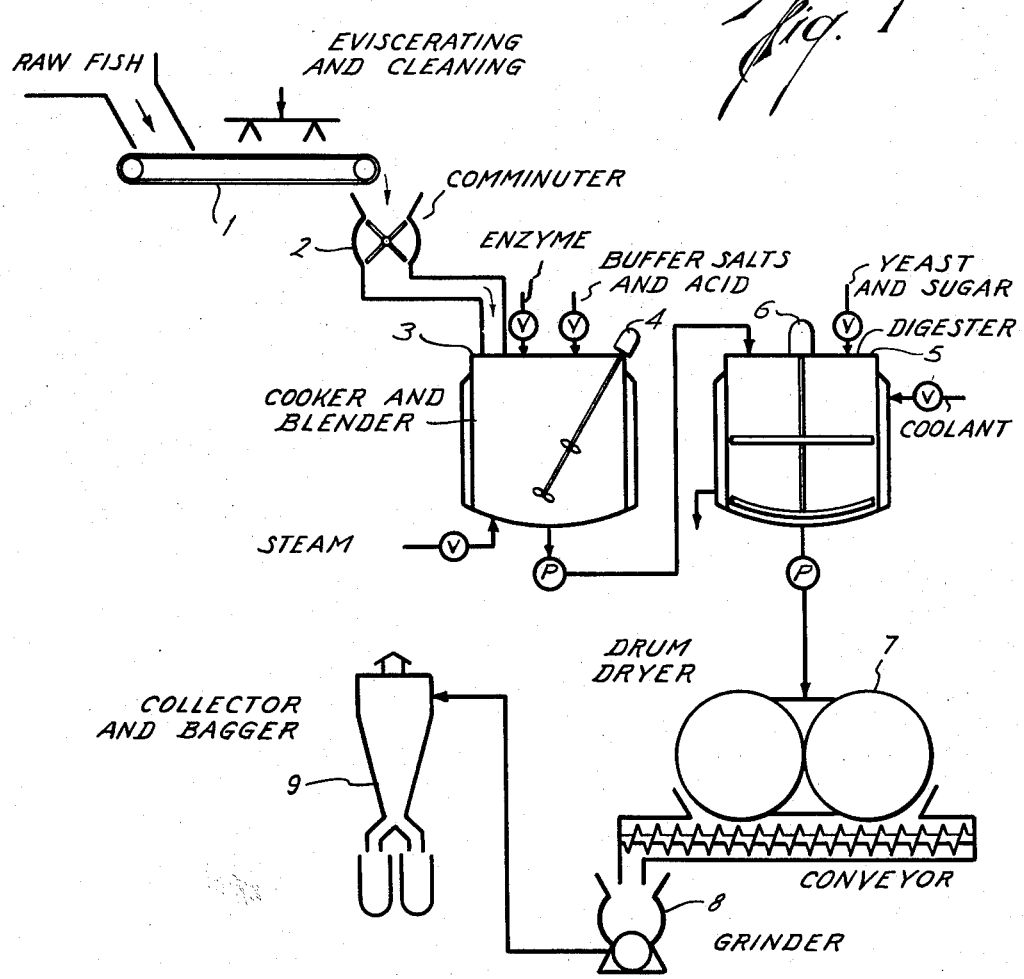

Feb. 23, 1965  G. A. JEFFREYS ETAL  3,170,794
PROCESS FOR PREPARING DEODORIZED FISH PROTEIN
Filed May 8, 1962  2 Sheets-Sheet 1

George A. Jeffreys
Abraham J. Krell
INVENTORS

BY

ATTORNEY

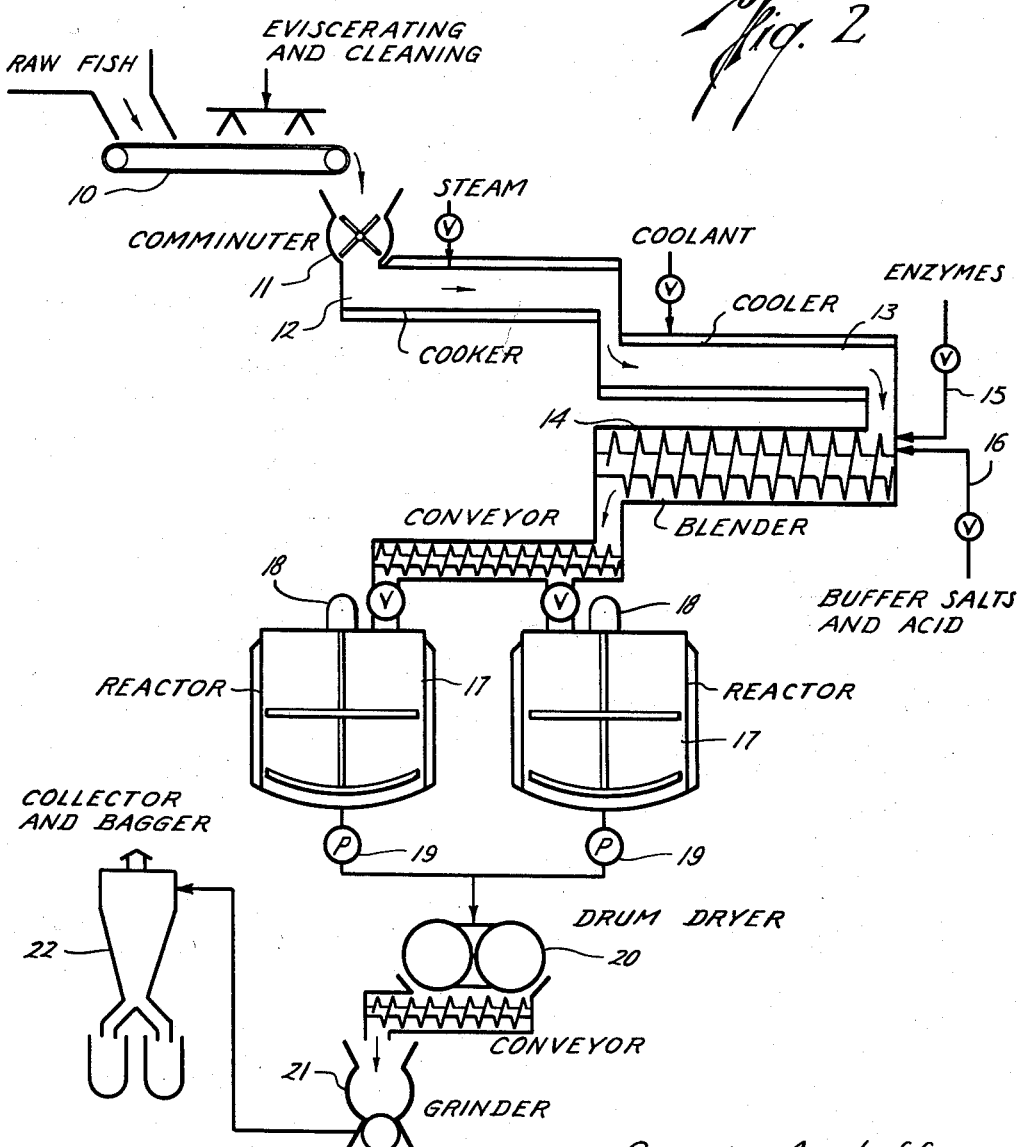

United States Patent Office 3,170,794
Patented Feb. 23, 1965

3,170,794
PROCESS FOR PREPARING DEODORIZED FISH PROTEIN
George A. Jeffreys, Salem, Va., and Abraham J. Krell, Houston, Tex., assignors to Reliance Chemicals Corporation, Houston, Tex., a corporation of Texas
Filed May 8, 1962, Ser. No. 193,883
9 Claims. (Cl. 99—18)

This invention relates to a new economical method of producing a concentrated protein powder or meal from fish that is free of fish odor and taste and to the product thereof, and more specifically, to fish protein compositions prepared by employing fungal enzymes to digest and liquify the fish and to neutralize the fish taste and odor.

It has been pointed out by many scientists that the sea contains tremendous potential of supplying the protein requirements of many people now living on deficient diets. However, the wide use of such protein has been restricted; first, because the taste and odor precludes its use in various food combinations; second, fish without processing can only be transported a relatively few miles inland; and third, the present dehydrating and treating processes do not produce a product that is free of fish odor so that this further eliminates its use in all kinds of fish combinations.

A number of methods have heretofore been devised for preparing fish products and eliminating fish odors. These generally involve some type of solvent extraction with alcohols, and require relatively expensive extraction procedures and apparatus and, in general, have not proven to be very satisfactory, particularly for the preparation of a fish product acceptable for human consumption.

A primary object of this invention is to provide a protein food product from fish which is substantially free of all fish odor and taste.

A principal object is to provide from fish a food protein of high food value by the employment of a fungal enzyme as a fish modifying agent.

An additional object is the provision of a high quality fish protein free of fish odor and taste by digesting precooked fish material with enzymes produced by the oryzae-flavus group of molds of the genus Aspergillus.

A further object of this invention is to provide from fish a food protein of high biological value by modifying the protein to a more digestible form without the use of alkalis and solvents that might leave toxic residues.

Still another object is to provide a method of low temperature enzyme activation in converting fish to desirable food proteins while inhibiting the growth of harmful bacteria.

Yet a further object is to provide an improved method of producing a high quality fish meal which is more efficient and economical than present commercial methods.

In accordance with the method of this invention, any type of fish material can be used as the source of the protein. For human consumption, fish with a low fat content is more preferable. Such fish include cod, haddock, whiting, and the like, which should be fresh and sound when processing is begun. For treating fish containing a higher percentage of oil than is most desirable, the excess oil can be extracted either by any standard solvent method before processing, or after the product is dried, or by the wet process conventionally used in the fish meal industry. Fish suitable for use in preparing animal feed and fertilizers may consist of trash fish, whole fish, or the waste products from canneries and food plants.

We have discovered that certain groups of fungal enzymes can modify the fish proteins without injuring their quality as a food product, and can also neutralize the fish odors and taste to a very high degree. The enzymes which we have fund to be especially effective are those produced by the *oryzae-flavus* group of molds of the genus Aspergillus.

In particular, we have discovered that the crude culture grown on a suitable solid nutrient material, particularly on wheat bran, produces the most effective protein-modifying enzymes. The entire culture, suitably comminuted, may be used advantageously, per se, or the culture may be extracted with water and the extract filtered and concentrated, if desired, and used in this form.

Commercially purified and precipitated enzymes produced from this mold, although efficient for a specific or single enzyme, do not produce the excellent results which we have found are produced by the whole culture or its extract. The reason for this is that the crude culture or its water extract contains many different types of enzymes, such as protease, amylase, lipase, pectinase, cellulase, zymase, rennet, etc. These enzymes act in a synergistic manner so that not only the proteins are modified, but the fishy taste and odor are greatly reduced or completely eliminated, or changed to an acceptable or neutral flavor.

In accordance with this invention we have found that by using enzymes of the character described, effective conversion of fish material to a high quality odor and taste-free protein product may be effected at temperatures well within the optimum ranges for enzymatic digestion processes. In general, we employ temperatures in the range of from about 30° C. to about 65° C. As will appear hereinafter, a digestion temperature of about 34° C. will be found preferable in accordance with one embodiment of this invention, while for other embodiments, digestion temperatures in the ranges of 42° C. to 46° C. and 52° to 56° C. are fully effective.

Moreover, in conventional food processing with enzymes, unless the food is sterile and the processing is conducted under absolutely sterile conditions, bacteria will multiply at these temperatures and interfere with the reaction and contaminate the food so that it becomes unacceptable. In this connection, we have also discovered at least two modifications of our process by which the enzymes may be used in treating the fish material while at the same time preventing or inhibiting bacteria from multiplying during the processing.

In one of these modifications, we have found that contaminating bacteria can be completely inhibited and kept from growing in the digestion liquor without harming the enzymes by inoculating the liquod mixture with from about one-quarter percent to about one-half percent active dry bakers' or brewers' yeast based on the liquid and supplementing it further with from about one-half percent to about three percent fermentable sugars.

Although it is known that bakers' or brewers' yeast of the genus Saccharomyces, particularly bakers' yeast, develop certain bactericidal substances that inhibit the development of harmful bacteria, particularly in the first stages of fermentation, the use of such agents in conjunction with enzyme digestion of fish material in accordance with this invention is a wholly new development.

The amount of sugar which may be used depends on the duration of the processing time. A short duration period of from one to two hours will require 1% or less of sugars, while a period of 8 hours' duration will require from 2% to about 3%. In each case that amount is used which will promote active fermentation for the processing period selected. Although any sugars that are fermented by yeast may be used, we prefer to use a reducing sugar, such as dextrose, glucose, fructose, and the like, since these sugars are found to be helpful in removing fish tastes. While the sugars are being fermented, the enzymes continue to modify the fish proteins. The amines responsible for the fish flavor will be set free by enzyme action and are either evaporated off during the processing, or are utilized by the yeast and converted into a more neutral type of protein.

The mixture undergoing treatment is also acidified with a food acid, preferably citric acid, to a pH of about 5.3 to about 5.6. Other acids may be used, such as hydrochloric, phosphoric or lactic. Citric acid is preferred, however, since it imparts a more pleasing flavor to the final product. A buffer material is also added in the form of a small proportion, for example 0.25%, of monocalcium phosphate. This also tends to inhibit bacteria growth.

The amount of enzyme culture or extract added is based on the fish solids, dry basis, and on the length of time of digestion which is to be employed. The preferred type of enzyme used is that produced by a 30-hour culture of *Aspergillus oryzae-flavus* on wheat bran dried to 6% moisture or its water extract equivalent. For eight hours digestion time the amount preferred to obtain an odorless product is 1% based on the fresh fish, or 5% based on the dried fish solids. More or less enzyme material may be used, if desired. For example, doubling the amount of enzymes will reduce reaction time by approximately one-half. Also, if it is desired to produce a fish meal with only a slight taste and odor of fish, then only enough enzyme is used to liquefy the fish material, after which it can be immediately drum dried.

In accordance with the second modification of this invention fish may be modified and deodorized, although to a somewhat lesser degree, without yeast fermentation, by reacting the fish with the same group of enzymes, but at such temperatures as will inhibit bacteria growth, but not entirely inactivate the enzymes. We have found that this temperature is in the range of between 53° and 56° C. This modification requires a higher concentration of enzymes, or a longer period of digestion, or both, to achieve similar results to those obtained at the lower temperatures using yeast fermentation. In this modification about 25% to 50% more enzymes, or a digestion time of from 25% to 50% longer duration will be required. We have also found that faster enzyme conversion can be obtained by first cooking the fish at moderate temperatures, not exceeding 70° C. and preferably in the range of 60° C. to 65° C. The high temperatures ordinarily used, such as 100° C., or higher, denature the proteins so that it takes longer for the enzymes to break them down. However, the higher cooking temperature may be employed in accordance with this invention, particularly where fish meal for animal consumption is desired and a poorer raw material is used. Cooking the fish at a lower temperature, 60° C. to 65° C. for 15 minutes or more will kill off all of the vegetative bacteria, yet some of the naturally occurring enzymes will still remain active and aid in the conversion process.

For human consumption, the fish should be eviscerated and cleaned with heads, tails, and fins removed, the preparation being conducted under clean, sanitary conditions. The cleaned fish is thereafter comminuted or chopped into pieces one-half inch square or less by means of a grinder or hammer mill, and the like, before being subjected to the conversion process in accordance with this invention.

The process, in accordance with the present invention, may be carried out by a step-wise batch process or in a continuous manner, or by the so-called "wet reduction" process, as will appear subsequently.

Further objects and advantages of this invention will become more apparent from the following detailed description when read in conjunction with the accompanying drawing.

In the drawing:

FIG. 1 is a flow diagram illustrating the batch process in accordance with one embodiment of this invention; and FIG. 2 is a flow diagram illustrating the continuous process in accordance with this invention.

Referring first to FIG. 1 which illustrates the batch or step-wise process, the fish, if for human consumption, is first eviscerated and cleaned, as described, at station 1. The cleaned fish is then conveyed through a comminuter 2 where it is cut up into small pieces. From the comminuter the fish is discharged into a cooking and blending kettle or vessel 3. This vessel is jacketed for heating and cooling and is equipped with a variable speed agitator 4. The fish is heated directly with steam to the desired temperature and agitated at relatively slow speed while cooking. Sufficient water is added to make the concentration about 20% fish solids. The amount of water for filets or cleaned fish will average about 20% or for 500 lbs. of fish will require 100 lbs. water. A small amount of additional water will be added through the steam cooking and the subsequently added enzyme and buffer solutions. The cooking may be conducted either at the higher temperature of 100° C. or at the preferred lower temperature of 60° C. to 65° C. In either case, a cooking time of ten minutes will usually be sufficient. The cooked fish is next cooled in vessel 3 to the desired temperature for either 55° C. temperature activation or for digestion at a low temperature of either 34° C. or at 42° C. to 45° C. Upon cooling to the selected temperature, the enzyme slurry is added in an amount equal to ½ to 2%, by weight, based on the wet fish, the exact amount depending on the processing time and degree of conversion desired.

As soon as the enzyme slurry or extract is added, a buffer salt of monocalcium phosphate is added in the amount of 0.25% by weight of the fish solids and citric or other suitable acid is added to the mixture to acidify the mixture to a pH of about 5.5. The fish material is now agitated or blended at high speed until it becomes liquefied and assumes a creamy consistency. This will usually take from 20 minutes to 1 hour depending on the amount of enzyme used. As soon as the fish is liquefied, it is pumped over into an activating or digesting kettle 5. This is a jacketed vessel equipped with a slow speed agitator 6 which keeps the fish material in suspension. The temperature of the vessel is maintained at the selected temperature previously mentioned, namely, either at a low temperature of 34° C. when yeast is used or for 54° C. to 56° C. without yeast. Where processing is without yeast, intermediate temperatures in the range 42° C. to 45° C. can be used for a short time.

With low temperature activation, dried bakers' or brewers' yeast is added in the amount of 1% based on the liquid fish and 1% to 2% dextrose or other fermentable sugar. Processing is continued in the activating vessel for 1 to 8 hours or more depending on the degree of conversion desired. Usually a completely odorless fish protein can be obtained in 6 to 8 hours. The reaction in the vessel can be stopped at any point by heating to 70° C. or higher. The liquid fish is thereupon delivered to the drum dryers 7 and dried thereby. The dried fish is scraped from the drums and pulverized in a grinder 8, such as a conventional hammermill, from which the meal is delivered to a conventional collector and bagger apparatus 9, where the product is suitably packaged.

FIG. 2 illustrates the continuous method of processing the fish using the various principles described above.

The fish is first eviscerated, cleaned or prepared at 10. The prepared fish is then discharged into a comminuter 11 where it is cut into small pieces then charged into a cooking conveyor 12. The fish is cooked directly with steam while being moved through the conveyor. The cooking may be conducted either at a temperature of 100° C. or at the preferred lower temperature of 60° C. to 70° C., for from 5 to 15 minutes as described above. From cooking conveyor 12 the fish is discharged into a jacketed cooling conveyor 13 where it is cooled by a suitable circulating coolant to the desired activating temperature which may be either 34° C. or in the range 42° C. to 45° C., or at 52° C. to 56° C., depending on the particular process selected.

From cooling conveyor 12 the cooked fish material is discharged into a high speed blender 14. At this point the enzyme is added in the form of a slurry or extract by means of a proportioning pump 15. At the same time, a solution of buffer salts of monocalcium phosphate and citric acid is injected by a similar proportioning pump 16 to bring the mixture to the desired pH value.

The capacity of the high speed blender 14 should be such that it will hold the fish for 30 minutes to 1 hour when the mixture becomes liquefied and assumes a smooth creamy consistency. The liquid fish is next discharged into a jacketed reacting tank 17 equipped with a mild agitator 18. Additional tanks may be used as desired to maintain a continuous flow. Each tank should be of a capacity to hold at least 1 hour's run from the blender.

The temperature of the liquid mixture in tank 17 is maintained at the reaction temperature selected.

For low temperature activation with yeast the temperature from either high or low cooking method is adjusted to 34° C. Dried bakers' or brewers' yeast is then added in the amount of 1% based on the liquid along with 1 to 2% dextrose or other fermentable sugar. Sufficient water is added if necessary so that the concentration is approximately 16 to 25% solids. The temperature of 34° C. is maintained from 1 to 8 hours or longer. At the end of the reaction period the pH of the digested fish is adjusted to 6.0 to 6.5. This is accomplished by using calcium or sodium hydroxide.

For high temperature activation the temperature of the cooked fish from either cooking method is adjusted to a range of 52 to 56° C. preferably from 54° C. to 55° C. As in the previous low temperature method, sufficient water is added to make a concentration of 16% to 20% fish solids with the same proportion of ingredients except that the yeast and fermentable sugar are omitted. A somewhat higher enzyme content, as previously noted, is required to bring about similar results to the low temperature method. At the end of the reaction period the liquor is neutralized as desired to a more neutral state with calcium or sodium hydroxide. It is then heated to 70° C. or higher to inactivate the enzymes and pasteurize the liquid. It is now pumper by pump 19 to the drum dryer 20, thence through the grinder 21 and to the collector and bagger 22.

When fish material is used having a high oil content, such as herring, pilchard, etc., or when using trash fish, waste material or whole fish, the conventional wet reduction process of extracting the oil may be used. In this case the cooking temperature should be in the neighborhood of 100° C. or higher. This is also accomplished in a continuous conveying steam cooker, like cooker 12. The high temperature coagulates the proteins and permits the liquid emulsion of oil and water to be pressed out in a continuous screw press. The separated liquid is known as stickwater. The oil is then separated from the liquid by means of a centrifuge. The water from the centrifuge instead of being processed separately is returned to the processing tank. Since additional water must be added to the fish it can be first used to wash out more oil from the press cake. The second stickwater is put through a second centrifuge to remove any oil and the final water is again returned to the tank and reacted.

The reacted liquid by any of the described methods becomes a creamy white emulsion composed of modified proteins in colloidal form and with fine particles of protein in suspension. Some of the proteins have been modified to peptones and peptides. In this form the proteins can be heated to higher temperatures without denaturing or damaging their biological value. The liquid mixture, if desired, can therefore be concentrated to a higher density for drying by boiling at atmospheric pressure or at reduced pressure up to 25 inches of vacuum.

If the concentration of fish solids is high enough, such as 16% or higher, then the step of concentrating by boiling can be eliminated and the liquid is dried directly on roller cylinders known as drum dryers. By this method the reacted liquid is dried in a thin sheet on rotating drums in a few seconds. This method of drying expels the remaining volatile fish odor and produces a pleasant meaty flavor.

When fish are used having an oil content that will produce a dried product with a fat content higher than 1%, the oil in the dried product is easily extracted with a solvent by any standard or known method to reduce the fat to less than 1%.

The invention is further demonstrated by the following examples:

EXAMPLE 1

*Low temperature activation*

The method described herein was based on the following formula and processed in a step-wise manner:

| Ingredients: | Parts by weight |
| --- | --- |
| Fish comminuted | 500.0 |
| Water | 100.0 |
| Enzyme or equivalent water extract | 5.0 |
| Monocalcium phosphate | 1.25 |
| Citric acid or equivalent | 3.0 |
| Dextrose | 10.0 |
| Compressed bakers' yeast | 5.0 |

500 parts of eviscerated and cleaned fish was comminuted to small pieces and then discharged into a jacketed cooking kettle. About 20% or 100 parts of water was added and the fish was cooked directly with steam to a temperature of 60° C. to 65° C. Slow agitation was used while cooking. The cooking temperature was maintained for about 10 minutes. The fish was next cooled to a temperature of 34° C. then the enzyme extract equal to 1% of the raw fish or 5 parts was added. Also, 1.25 parts of monocalcium phosphate and 3 parts citric acid was added. This made a pH of 5.5. Baker's yeast was then added in the amount of 1% or 5 parts and 2% dextrose or 10 parts. The mixture was agitated at high speed for 1 hour. In 30 minutes the mixture became liquid and in 1 hour it assumed a creamy consistency. The liquid fish was next transferred by a pump to a holding or activating vessel where mild agitation was maintained for a period of 7 hours at a temperature of 34° C.

At the end of this time the pH was adjusted with sodium hydroxide to pH 6.2 and the mixture was then heated to about 82° C. which rendered the material inactive and prepared it for drying.

The liquid fish was then pumped to drum dryers where it was dried at atmospheric pressure, using 40 lbs. steam pressure on the drums, then pulverized, collected and bagged. The final product assayed as follows:

| | Percent |
| --- | --- |
| Protein | 80 |
| Fat | 0.8 |
| Moisture | 5.6 |
| Ash | 13.6 |

EXAMPLE 2

*Continuous method*

The eviscerated and cleaned fish was continually disintegrated through a one inch screen and discharged into a steam conveyor. The fish was heated directly with steam to a temperature of 60° C. to 65° C. while travelling through the conveyor. The cooking temperature was maintained for about 10 minutes. The fish material was next discharged into a jacketed cooling conveyor where it was cooled to a temperature of 34° C. From the cooling conveyor it was discharged into high speed mixing conveyor. The required proportion of enzymes was injected into the stream in the form of water extract by means of a proportioning pump. This proportion of enzymes was 1% based on the fresh fish. Also at the same time a solution of buffer salt and acid was added to make a pH of 5.5. The retention time in the high speed conveyor was 40 minutes. From this conveyor it was discharged into a reaction tank equipped with a slow speed stirrer.

While the reaction tank was being charged with the liquid fish from the mixing conveyor the required amount of yeast, dextrose and water was added and stirred in to make a concentration of 16% fish solids. The tank was of sufficient size to hold all the processed fish discharged from the mixing conveyor in approximately 1 hour. As soon as the tank was filled to the required level a second and succeeding tanks were filled. The liquid fish in the tank was maintained at a temperature of 34° C. for 6 hours with mild agitation. At the end of this time the fish solids became modified and formed a homogeneous emulsion of creamy consistency. The liquid fish was now neutralized with sodium hydroxide to a pH of 6.2 and was then heated to 77° C. which inactivated the yeast and enzymes and prepared the material for drying. The drying was accomplished by pumping the liquid fish to a set of atmospheric drum dryers. The product produced was a light tan color, friable, non-hygroscopic. It was easily pulverized into a powder. There was no apparent odor of fish particularly when blended with other foods, but on the other hand imparted a meaty and full flavored taste and odor. The final product assayed as follows:

|  | Percent |
|---|---|
| Protein | 81.0 |
| Fat | 0.8 |
| Moisture | 6.0 |
| Ash | 12.2 |

EXAMPLE 3

*High temperature activation*

The same steps were used as in Example 2 except that the material after cooking was cooled to between 42° C. and 45° C. It was kept at this temperature through the high speed blender. The enzymes, buffers and acid was added in the usual manner. The activation temperature in the digestion tank was maintained at 54° C. The dextrose and yeast were omitted and the enzyme increased to 1½%. After six hours the liquid fish was dried on atmospheric drum dryers. A product was produced similar to Example 1. The flavor was not quite equal to that of Example 1 but was entirely acceptable.

EXAMPLE 4

*Fast method*

The same steps were used as in Example 3. The enzyme content was the same as in Example 2. The liquid fish in the digestion tank was maintained at a temperature of 45° C. to 48° C. for 30 minutes then pumped without further heating to the drum dryers where it was dried and ground. The product produced was of a light tan color with only a slight flavor and ordor of fish.

EXAMPLE 5

*Trash and whole fish material with high oil content*

The first material was cooked directly with steam to 100° C. while travelling through a conveyor. The cooked material was discharged into a screw press. This pressed out the oil and water in the form of an emulsion. The pressed fish was discharged into the cooling conveyor where it was cooled to 45° C. The emulsion was conveyed to a centrifuge which separated the oil from the water. The stickwater was conveyed to the head of the high speed blender where it was recombined with the pressed fish from the cooling conveyor. Sufficient enzymes, buffer, acid and water was added at this point to adjust the solids content to between 16% and 20% and the mixture was conveyed through the high speed blender at 45° C. where it was liquefied in 30 minutes.

The liquid fish was then discharged in a reaction tank and held at 55° C. for another 30 minutes when it was drum dried, pulverized and bagged. The product was of a light tan color with a slight fish taste and odor.

In general the product produced by our process, particularly that intended for human consumption will be of a very light tan color, friable, non-hygroscopic, completely free of fish odor and taste, and assays as follows:

|  | Percent |
|---|---|
| Protein | 80.0–87.0 |
| Fat | 0.5–0.8 |
| Moisture | 6.0–5.0 |
| Ash | 13.5–7.2 |

It will be evident that various changes and modifications may be made in the details of the illustrative embodiments within the scope of the appended claims without departing from the spirit of this invention.

What we claim and desire to secure by Letters Patent is:

1. The process of preparing deodorized fish protein which comprises, digesting pre-cooked fish meat having a concentration of 16% to 25% fish in water with protein-modifying fungal enzymes in the presence of yeast and sugar at a temperature in the range from about 30° C. to about 65° C. for ½ to 8 hours to liquefy the fish meat and reduce the fish odor and taste to a desired low level, continually agitating the ingredients during the digestions said enzymes being those produced by culturing molds of the *oryzae-flavus* group of the genus Aspergillus on a solid nutrient, and drying the resulting fish product.

2. A process according to claim 1 wherein the quantity of said enzymes is in the range from about ½% to about 2% by weight of the raw fish solids undergoing digestion.

3. The process of preparing deodorized fish protein which comprises, digesting pre-cooked fish meat having a concentration of 16% to 25% fish in water with protein-modifying fungal enzymes at a temperature of 34° C. for ½ to 8 hours to liquefy the fish meat and reduce the fish odor and taste to a desired low level, continually agitating the ingredients during the digestions said enzymes being those produced by culturing molds of the *oryzae-flavus* group of the genus Aspergillus on a solid nutrient, contemporaneously fermenting a sugar with a yeast in the material undergoing digestion to inhibit bacteria growth during digestion, and drying the resulting fish product.

4. A process according to claim 3 wherein said sugar is a reducing sugar and said yeast is a member of the class consisting of bakers' yeast and brewers' yeast.

5. A process according to claim 3 wherein the quantity of said enzymes is in the range from about ½% to about 2% by weight of the raw fish solids undergoing digestion.

6. A process according to claim 5 wherein the quantity of said yeast is about 1% and the quantity of said sugar is in the range of from about 1% to about 3% by weight of the liquid material undergoing digestion.

7. The process of preparing deodorized fish protein which comprises the steps of:
 (a) eviscerating and cleaning fresh fish;
 (b) comminuting the cleaned fish meat;
 (c) cooking the comminuted fish meat to a temperature in the range from about 60° C. to about 70° C. for a period of from about 5 minutes to about 15 minutes;
 (d) cooling the fish meat to a temperature in the range of from about 52° C. to about 56° C.;
 (e) admixing with the cooled fish meat having a concentration of 16% to 25% of fish in water an amount from about ½% to about 2% by weight of the fish meat of protein-modifying fungal enzymes produced by culturing molds of the *oryzae-flavus* group of molds of the genus Aspergillus on solid wheat bran continually agitating the ingredients during the digestion and about 1% by weight of a member of the class consisting of brewers' yeast and bakers' yeast and a sugar fermentable by said yeast in an amount ranging from about 1% to about 3% by weight of said fish meat;

(f) adjusting the pH of the mixture to a value in the range from about 5.3 to about 5.6;

(g) digesting the admixture at a temperature in the range from about 52° C. to about 56° C. for a period in the range from about one-half hour to about 8 hours;

(h) thereafter raising the temperature of the digested material to a temperature above 70° C. to inactivate the enzymes; and (i) drying the resulting fish product.

8. The process of preparing deodorized fish protein which comprises the steps of:

(a) eviscerating and cleaning fresh fish;

(b) comminuting the cleaned fish meat;

(c) cooking the comminuted fish meat to a temperature in the range from about 60° C. to about 70° C. for a period of from about 5 minutes to about 15 minutes;

(d) cooling the fish meat to a temperature of about 34° C.;

(e) admixing with the cooled fish meat having a concentration of 16% to 25% fish in water the following:

(1) an amount from about ½% to about 2% by weight of the meat of protein-modifying fungal enzymes produced by culturing molds of the *oryzae-flavus* group of molds of the genus Aspergillus on solid wheat bran continually agitating the ingredients during the digestion;

(2) an amount of an acid sufficient to adjust the pH of the cooled fish meat to a value in the range from about 5.3 to about 5.6;

(3) about 1% by weight of a member of the class consisting of brewers' yeast and bakers' yeast and a sugar fermentable by said yeast in an amount ranging from about 1% to about 3% by weight of said fish meat;

(f) digesting the admixture formed in step (e) at a temperature of 34° C. for a period in the range from about one-half hour to about 8 hours;

(g) thereafter raising the temperature of the digested material to a temperature above 70° C. to inactivate said enzymes and the yeast fermentation; and (h) drying the resulting fish product.

9. The process according to claim 1, wherein the quantity of said enzyme is in the range of about ½% to about 2% by weight of the raw fish solids undergoing digestion.

References Cited by the Examiner

UNITED STATES PATENTS 1,556,772  10/25  Endo _____ 99—112
3,113,030  12/63  Brody _____ 99—111 X

OTHER REFERENCES

Industrial Fermentations, vol. II, pages 142–143, Chemical Publishing, N.Y., 1954.

Marine Products of Commerce, 1951, Reinhold Publishing, N.Y., pages 486–487.

A. LOUIS MONACELL, *Primary Examiner.*

ABRAHAM H. WINKELSTEIN, *Examiner.*